United States Patent [19]

Shriver, Jr.

[11] 4,088,802
[45] May 9, 1978

[54] PROCESS FOR COATING ENVELOPE FOR REFLECTOR-TYPE FLUORESCENT LAMP AND THE LAMP RESULTING THEREFROM

[75] Inventor: Lloyd L. Shriver, Jr., Grafton, W. Va.

[73] Assignee: Westinghouse Electric Corp., Pittsburgh, Pa.

[21] Appl. No.: 690,753

[22] Filed: May 27, 1976

[51] Int. Cl.² .............. H01J 1/62; H01J 1/70
[52] U.S. Cl. .................. 427/67; 427/106;
427/230; 427/231; 427/232; 427/235; 427/269;
427/270; 427/355; 427/368; 427/376 A
[58] Field of Search ............. 427/67, 231, 106, 269,
427/376 A, 386, 277, 355, 271, 368, 230, 232,
235, 270; 313/485, 486, 488, 489

[56] References Cited

U.S. PATENT DOCUMENTS

| | | |
|---|---|---|
| 2,906,105 | 9/1959 | Wares .................. 313/485 |
| 3,068,114 | 12/1962 | Ranby .................. 427/67 |
| 3,275,872 | 9/1966 | Chernin ................ 313/488 |
| 3,541,377 | 11/1970 | Nagy .................... 427/67 |
| 3,679,452 | 7/1972 | Ropp .................... 427/67 |
| 3,912,828 | 10/1975 | Olwert .................. 427/67 |
| 3,984,590 | 10/1970 | Mason .................. 427/106 |
| 3,995,191 | 11/1976 | Kaduk .................. 313/486 |

Primary Examiner—Michael F. Esposito
Attorney, Agent, or Firm—W. D. Palmer

[57] ABSTRACT

Process for coating elongated lamp envelope for reflector-type fluorescent lamp in which only one lehring step is used to remove binder from the applied plural coatings, thereby reducing lamp costs and simplifying the coating process. The reflector portion of the coating is formed of mixed titania and phosphor, which permits the reflective material to be removed from the end portions of the coated envelope after the applied reflective material coating and overlying phosphor have been lehred. There is also provided the resulting lamp.

5 Claims, 3 Drawing Figures

PROCESS FOR COATING ENVELOPE FOR REFLECTOR-TYPE FLUORESCENT LAMP AND THE LAMP RESULTING THEREFROM

BACKGROUND OF THE INVENTION

This invention relates to a process for coating reflector-type fluorescent lamp envelopes and the resulting lamp and, more particularly, to an improved process for coating envelopes for reflector-type fluorescent lamps wherein only one lehring step is used to remove binder from the applied plural coatings.

Reflector-type fluorescent lamps have been known for many years and are used for applications where the light from the lamps is to be directed downwardly. Such lamps have been fabricated by applying over the envelope a finely divided white-appearing material which extends radially around only a predetermined proportion of the interior circumferential surface of the envelope to leave a reflective-material-uncoated longitudinal aperture through which the generated light may pass. Over the entire interior surface of the envelope is coated a light-generating finely divided phosphor which covers over both the reflective material coating and the remaining longitudinal aperture. Representative lamps have utilized an aperture which subtends an angle of about 130°, with the reflective coating material covered over the remaining 230° of the envelope. The best material for forming the reflector is finely divided titania which functions very effectively because of its state of division and its extremely high index of refraction.

In fabricating such lamps in accordance with the best practices of the prior art, the titania is first applied by flushing a slurry or so-called paint of the titania over a limited section of the envelope and then lehring the envelope at a somewhat limited temperature, such as 500° C to 550° C for 1 minute, to partially remove the binder material therefrom. The ends of the envelopes are then cleaned in order to remove reflective material therefrom to permit the lamp cathode carrying mounts to be later sealed in the cleaned envelope ends during the lamp fabrication. After the end cleaning operation, the envelopes are then fully lehred, such as at a temperature of 650° C for 1 minute, in order to completely remove the binder material from the applied titania coating. The phosphor paint is thereafter applied over the entire interior envelope surface, the envelope is lehred again to volatilize binder from the applied phosphor, the applied phosphor cleaned from the end portions of the envelope to permit the mounts to be sealed therein, and lamp fabrication then completed.

The foregoing three lehring operations, two at a relatively high temperature and one at a somewhat restricted temperature, have caused the envelopes to shrink in their longitudinal dimension and a 4 foot (122 cm) fluorescent lamp envelope can shrink in longitudinal dimension from 20 mils (0.5 mm) to 50 mils (1.5 mm). Since a fluorescent lamp must be very carefully controlled with respect to its length dimension in order to fit into the fixtures, this has initially necessitated fabricating extra long envelopes where reflector-type lamps were to be made, creating problems of fabrication, storage and inventory. In addition, the three separate lehring steps have constituted a substantial expenditure in labor and time.

The foregoing separate lehring operations have been required to be able to end clean the applied titania from the coated envelope since even though the titania is a relatively refractory material, at the indicated lehring temperatures of about 650° C it will incipiently fuse to the glass envelope thereby making end cleaning extremely difficult. For this reason, the initial reduced lehring temperature of about 500° C to 550° C is needed to enable the envelopes to be end cleaned, with the binder thereafter completely removed by relehring at an increased temperature.

SUMMARY OF THE INVENTION

There is provided a method of coating the elongated envelope of a reflector-type fluorescent lamp while using only one lehring operation to remove binder in one step from both the coated reflective material and coated phosphor material. The lamp is of generally conventional construction insofar as the reflector portion comprises a finely divided white-appearing material coated onto and extending radially around only a predetermined proportion of the interior circumferential surface of the envelope, in order to leave a reflective-material-uncoated longitudinal aperture through which the generated light may pass, with light-generating finely divided phosphor material coated over both the reflective material coating and the remaining longitudinal aperture. In accordance with the present improved method, there is flowed over only a predetermined proportion of the interior circumferential surface of the elongated fluorescent tube, a reflective material coating paint slurry comprising a mixture of finely divided titania and phosphor in the relative weight proportions of about 25 to 50% titania and about 75 to 50% phosphor, both suspended in organic vehicle having dissolved therein binder material which is insoluble in water, in order to provide the slurry with a predetermined viscosity to deposit a predetermined weight of reflective material slurry onto the envelope. The organic vehicle is then evaporated from the applied reflective material coating. There is then flowed over the entire envelope interior surface a phosphor coating paint slurry comprising finely divided phosphor material suspended in aqueous vehicle having dissolved therein water soluble binder material to provide the phosphor slurry with a predetermined viscosity to deposit a predetermined weight of phosphor material slurry onto the envelope. The double coated envelope is then lehred in one step at a sufficient temperature and for a sufficient time to burn out and remove the binders from the applied material coatings. The lehred envelope is then end cleaned in order to remove both reflective material and phosphor material from the envelope end portions for a sufficient distance to permit the cathode carrying mounts to be sealed in the cleaned envelope ends. Because of the phosphor mixed with the titania, the incipient sintering of the titania to the glass envelope is minimized and the fully lehred reflective coating can be readily removed. The reflective properties of the titania are not measurably affected by the phosphor mixed therewith, however, so that a standard length bulb may be initially used and the multiple lehring operations previously required are eliminated.

BRIEF DESCRIPTION OF THE DRAWINGS

For better understanding of the invention, reference may be had to the preferred embodiment, exemplary of the invention, shown in the accompanying drawings, in which.

DESCRIPTION OF THE PREFERRED EMBODIMENT

Figure 1:
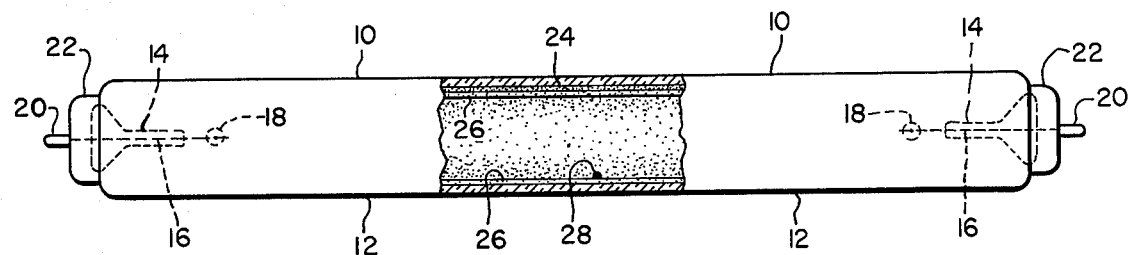
FIG. 1 is an elevational view, shown partly in section, of a fluorescent lamp which incorporates the improved reflective coating of the present invention.

With reference to the lamp as shown in FIG. 1, this is a 40 watt T12 type reflector fluorescent lamp 10 comprising a tubular light-transmitting vitreous envelope 12 which is fabricated of the usual soda-lime-silica glass, for example. Mounts 14 are sealed to the ends of the envelope 12, as is customary. Lead-in conductors 16 support oxide-coated filaments 18 which are operatively positioned proximate each envelope end, and electrical connections for the lead-in conductors 16 are made by contact pins 20 which project from support base caps 22 at both ends of the lamp 10. The envelope 12 has coated on its inner surface a first layer of reflective material 24, which will be described in greater detail hereinafter, and coated over the reflective material layer is a layer of phosphor material 26. As in conventional, the envelope encloses a small pressure of inert ionizable starting gas such as four torrs of argon, for example, and a small charge of mercury 28.

Figure 2:
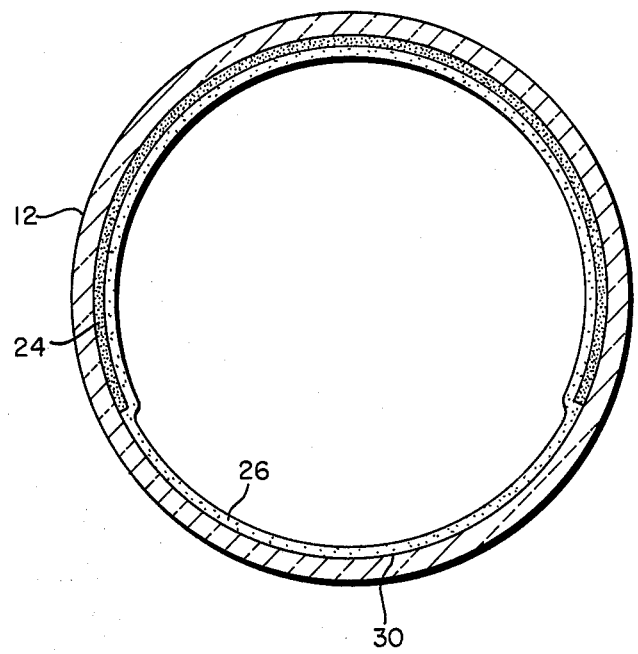
FIG. 2 is an enlarged cross-sectional view of a portion of the envelope of the lamp as shown in FIG. 1 illustrating in greater detail the present improved reflective coating.

The reflective coating 24 and phosphor coating 26 are shown in greater detail in FIG. 2 wherein the reflective coating 24 comprises a mixture of about 25 to 50% by weight titania and about 75 to 50% by weight of finely divided phosphor. This coating of finely divided, white-appearing reflective material covers over and extends radially around only a predetermined proportion of the interior circumferential surface of the envelope to leave a reflective-material-uncoated longitudinal aperture 30 through which the generated light may pass. The light-generating, finely divided phosphor material 26 is coated over the reflective material coating 24 and the remaining longitudinal aperture 30, and the phosphor is excited by the low pressure discharge to generate visible light which ultimately passes through the aperture 30.

Figure 3:
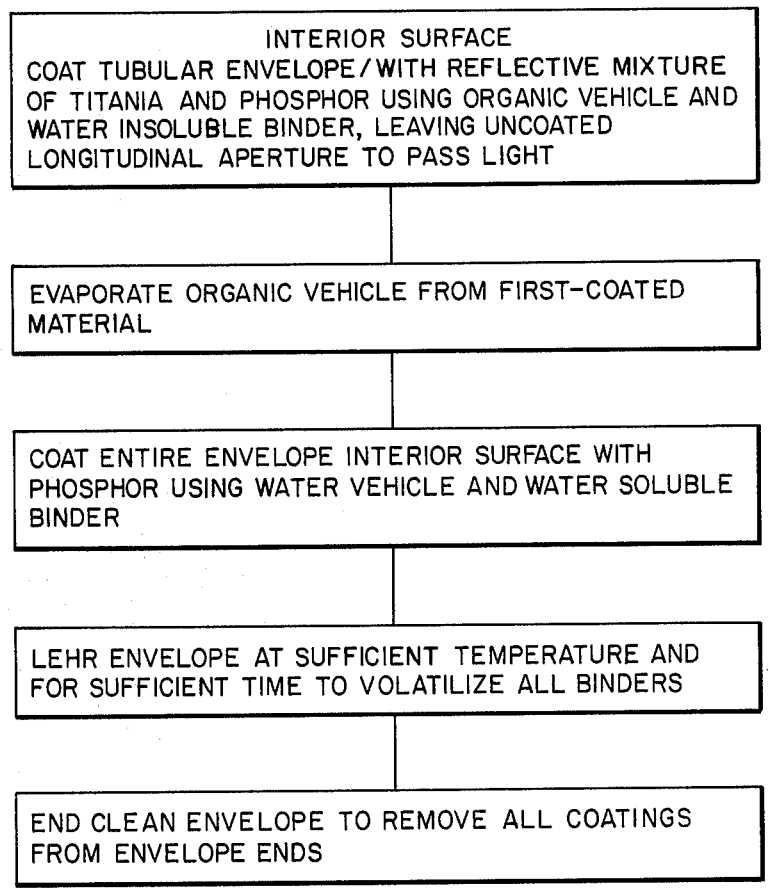
FIG. 3 is a flow chart setting forth the basic steps of the present method.

The basic steps of the present method are shown in the flow diagram of FIG. 3. As a specific example for coating the envelope 12, the reflective material coating paint slurry is first prepared by mixing 35 kilograms of finely divided titania with 16 liters of ethyl cellulose powder dissolved in xylol (49% by weight ethyl cellulose) with additional organic solvent (95% xylol and 5% butanol) in amounts of 32 liters and 2 liters dibutyl phthlate as additional solvent. To this is added 65 kilograms of cool white halophosphate phosphor along with 4 liters of additional xylol-butanol. The foregong coating paint is thoroughly agitated to form a uniform slurry and is then flowed into the bottom portion of a horizontal fluorescent lamp tube. The tube is then rotated so that the paint covers approximately 230° of the circumferential interior of the tube, and residual paint is then poured from the tube.

Summarizing the foregoing reflective material coating paint slurry, the reflective material comprises finely divided titania and phosphor which can be mixed in relative weight proportions of about 25 to 50% titania and about 75 to 50% phosphor, both suspended in organic solvent having dissolved therein binder material which is insoluble in water, in order to provide the slurry with a predetermined viscosity to deposit a predetermined weight of the reflective material slurry onto the envelope. As a specific example, the foregoing titania has a particle size of about 2 microns and the phosphor has an average particle size of about 6 to 12 microns. The viscosity of the foregoing prepared slurry is 60 cps, which when applied to 230° of the envelope circumferential interior will, in the case of a 4 foot (122 cm) envelope, deposit approximately 5 grams of the reflective material coating. This provides a coating weight of 5 mg/cm$^2$ of coated surface.

In the next coating step, the residual organic vehicle is evaporated from the applied reflective material coating leaving the binder in place along with the deposited reflective material. The phosphor coating paint is then flowed over the entire interior surface of the envelope, including both the reflective material 24 and the uncoated aperture 30. The phosphor coating paint comprises finely divided phosphor material which is suspended in aqueous vehicle having dissolved therein water soluble binder material, in order to provide the phosphor slurry with a predetermined viscosity to deposit a predetermined weight of phosphor material slurry onto the interior surface of the envelope. As a specific example, the phosphor binder is hydroxy alkyl cellulose, and preferably hydroxy ethyl cellulose. Such coating compositions are described in detail in U.S. Pat. No. 3,833,392 dated Sept. 3, 1974 and in U.S. Pat. No. 3,832,199 dated Aug. 27, 1974. As a specific example, to 1600 liters of deionized water are added 60 kilograms of hydroxy ethyl cellulose and the mixture is agitated for about 2 hours. The solution is then pumped through a 75 micron filter to remove any undissolved particles and is then run through a cationic exchange resin bed, as disclosed in the aforementioned U.S. Pat. No. 3,832,199. Sufficient ammonium hydroxide solution is then added to raise the pH to about 6.5–7.0 and the coating paint is then prepared from the foregoing mixture. In preparing the phosphor coating paint, 80 liters of deionized water are mixed with 480 liters of the foregoing hydroxy ethyl cellulose solution, and to this are added 40 liters of a slurry formed of 2.3 kilograms of aluminum oxide in deionized water, 8 gallons of triethanolamine, 600 cc of a commercial defoamer, 800 cc of a commercial wetting agent and 455 kg of cool white halophosphate phosphor. Summarizing the phosphor paint slurry, it comprises finely divided phosphor material suspended in aqueous vehicle having dissolved therein water soluble binder material, in order to provide the phosphor slurry with a predetermined viscosity to deposit a predetermined weight of phosphor material slurry onto the envelope. As a specific example, the foregoing slurry will have a viscosity of approximately 90 cps and when flowed over the interior surface of a 4 foot (122 cm) fluorescent tube, there will be deposited approximately 6.6 grams of phosphor. This provides a coating weight of 4.5 mg/cm$^2$ of coated surface.

The foregoing envelopes are then lehred in one step at a sufficient temperature and for a sufficient time to burn out and remove the residual ethyl cellulose binder and hydroxy ethyl cellulose binder from the respective applied material coatings. This lehring is readily accomplished by heating the coated envelopes in an air atmosphere at a temperature of approximately 650° C for a period of approximately 1 minute, which will completely volatilize the binders. It is important that the binder in the first applied coating, namely, ethyl cellulose, is not soluble in water since when the phosphor aqueous slurry is flowed thereover, the first applied coating will not have the binder washed therefrom.

Thereafter, the envelopes are end cleaned simply by wiping the reflective material and the phosphor material from the end portions for a sufficient distance such as 2 mm to permit the cathode carrying mounts 14 to be sealed in the cleaned envelope ends. The lamp fabrication is then completed by envelope baking, evacuation, mercury dosing and gas-fill, and finally tipping off and basing.

In its preferred form, the phosphor portion of the reflective material layer 24 is formed of the same phosphor as is coated over the entire interior surface of the envelope, although different phosphors could be used if desired since the phosphor which is mixed with the reflective material layer contributes substantially no light to the overall lamp emission because of the presence of the titania. The preferred phosphor is cool white halophosphate phosphor which conventionally is calcium halophosphate phosphor with antimony and manganese activators. Such phosphors of course are well known in the fluorescent lamp art and any conventional phosphor can be used in the lamp.

While the envelope as shown in FIG. 1 has a straight tubular configuration, it should be understood that other envelope configurations can be used such as those having a dimpled configuration or an envelope having a circular or semicircular configuration.

The average particle diameter of most titania is about 2 microns, but any finely divided titania can be used and the particle size is not critical. While a repesentative average particle size of the halophosphate phosphor is about 6 to 12 microns, depending upon the processing techniques used, this too can vary over a wide range. The phosphor particle size will also vary with the type of phosphor used.

While the preferred lamp construction utilizes an aperture which subtends an angle of about 130°, this too can be varied if desired.

The preferred ratio of titania to phosphor in the reflective coating 24 is about 35:65 as previously indicated, and this can be varied considerably. If the titania is present in less than about 25% by weight, some of the reflecting properties may be lost and if the titania is present in the reflective coating 24 in amounts of more than about 50% by weight, there may be excessive sintering of the reflective layer to the envelope during the single step lehring. When titania is used in the indicated amount of from about 25% to about 50% by weight of the reflective coating, however, the performance has been very satisfactory both from the reflective nature of the coating and the relative ease of removal after lehring.

What is claimed is:

1. The method of coating the elongated envelope of a reflector-type fluorescent lamp while using only one lehring operation to remove binder in one step from the coated reflective material and coated phosphor material, the reflector comprising finely divided white-appearing material coated onto and extending radially around only a predetermined proportion of the interior circumferential surface of said envelope to leave a reflective-material-uncoated longitudinal aperture through which the generated light may pass, and light-generating finely divided phosphor coated over both the reflective material coating and the remaining longitudinal aperture, which method comprises:

(a) flowing over only a predetermined proportion of the interior circumferential surface of an elongated fluorescent tube, a reflective material coating paint slurry comprising a mixture of finely divided titania and phosphor in the relative weight proportions of about 25 to 50% titania and about 75 to 50% phosphor both suspended in organic solvent having dissolved therein binder material which is insoluble in water to provide the slurry with a predetermined viscosity to deposit a predetermined weight of reflective material slurry onto said envelope;
   (b) evaporating organic vehicle from the applied reflective material coating;
   (c) flowing over the entire envelope interior surface a phosphor coating paint slurry comprising finely divided phosphor material suspended in aqueous vehicle having dissolved therein water soluble binder material to provide the phosphor slurry with a predetermined viscosity to deposit a predetermined weight of phosphor material slurry onto said envelope;
   (d) lehring in one step the coated envelope at a sufficient temperature and for a sufficient time to burn out and remove residual binders from the applied material coatings; and
   (e) end cleaning said envelope to remove reflective material and phosphor material from the envelope end portions for a sufficient distance to permit cathode carrying amounts to be sealed in the cleaned ends thereof.

2. The method as specified in claim 1, wherein said reflective material paint slurry has xylol as its primary organic vehicle, the binder of said reflective material paint slurry is ethyl cellulose, and the viscosity of said reflective material paint slurry is about 60 cps, said phosphor material paint slurry has water as its primary vehicle, the binder for said phosphor material paint slurry is hydroxy ethyl cellulose, and the viscosity of said phosphor material paint slurry is about 90 cps.

3. The method as specified in claim 1, wherein the weight ratio of titania to phosphor in said reflective coating material paint slurry is about 35:65.

4. The method as specified in claim 1, wherein the phosphor in said reflective coating material paint slurry is the same as the phosphor in said phosphor coating paint slurry.

5. The method as specified in claim 4, wherein said phosphor is cool white halophosphate phosphor.

* * * * *